US010208465B2

(12) United States Patent
Martin

(10) Patent No.: US 10,208,465 B2
(45) Date of Patent: Feb. 19, 2019

(54) INFRA-RED CONTROL DEVICE

(71) Applicant: CELEC CONCEPTION ELECTRONIQUE EN ABREGE CELEC, Neufchatel-en-Bray (FR)

(72) Inventor: Matthieu Martin, Sainte Beuve en Riviere (FR)

(73) Assignee: CELEC CONCEPTION ELECTRONIQUE EN ABREGE CELEC, Neufchatel-en-Bray (FR)

( * ) Notice: Subject to any disclaimer, the term of this patent is extended or adjusted under 35 U.S.C. 154(b) by 0 days.

(21) Appl. No.: 15/513,560

(22) PCT Filed: Sep. 24, 2015

(86) PCT No.: PCT/EP2015/072041
§ 371 (c)(1),
(2) Date: Mar. 23, 2017

(87) PCT Pub. No.: WO2016/046345
PCT Pub. Date: Mar. 31, 2016

(65) Prior Publication Data
US 2017/0335553 A1 Nov. 23, 2017

(30) Foreign Application Priority Data
Sep. 24, 2014 (FR) ...................................... 14 58985

(51) Int. Cl.
*E03C 1/05* (2006.01)
*E03D 5/10* (2006.01)
(Continued)

(52) U.S. Cl.
CPC .............. *E03C 1/057* (2013.01); *A45D 20/08* (2013.01); *A47K 5/1217* (2013.01); *A47K 10/48* (2013.01);
(Continued)

(58) Field of Classification Search
CPC ....... E03C 1/057; A45D 20/08; A47K 5/1217; A47K 10/48; E03D 5/105; F16K 31/0675; G01S 17/026; G01S 17/88
See application file for complete search history.

(56) References Cited

U.S. PATENT DOCUMENTS 5,636,318 A 6/1997 Polaert et al.
5,781,229 A * 7/1998 Zediker .................... H04N 5/74
250/206.1
(Continued)

FOREIGN PATENT DOCUMENTS

EP 0468062 A1 1/1992
EP 672871 9/1995
(Continued)

*Primary Examiner* — Frederick C Nicolas
(74) *Attorney, Agent, or Firm* — Workman Nydegger

(57) ABSTRACT

A control device (1) for a washroom facility that includes an actuator (2); a sensor (4) configured to detect the presence of a user in the proximity of the sensor (4); and a control circuit (6) receiving, as input, signals from the sensor (4) and configured to control the actuator (2). The sensor (4) includes an emitter (10) configured to emit an infrared signal; and a receiver (8) configured to detect the infrared signal emitted by the emitter (10). The invention also provides a washroom facility, a substance dispenser, and a hair dryer or hand dryer, including such a control device (1).

12 Claims, 2 Drawing Sheets

(51) Int. Cl.

| | | |
|---|---|---|
| *F16K 31/06* | (2006.01) | |
| *G01S 17/02* | (2006.01) | |
| *G01S 17/88* | (2006.01) | |
| *A45D 20/08* | (2006.01) | |
| *A47K 10/48* | (2006.01) | |
| *A47K 5/12* | (2006.01) | |
| *G01S 17/08* | (2006.01) | |

(52) U.S. Cl.
CPC .......... *E03D 5/105* (2013.01); *F16K 31/0675* (2013.01); *G01S 17/026* (2013.01); *G01S 17/08* (2013.01); *G01S 17/88* (2013.01)

(56) References Cited

U.S. PATENT DOCUMENTS

| | | | | |
|---|---|---|---|---|
| 6,053,413 A * | 4/2000 | Swift | ................ | G06K 7/10554 |
| | | | | 235/462.43 |
| 6,215,116 B1 | 4/2001 | Van Marcke | | |
| 6,379,969 B1 * | 4/2002 | Mauze | ................ | G01N 21/6428 |
| | | | | 422/82.05 |
| 6,690,958 B1 * | 2/2004 | Walker | ................ | A61B 5/14542 |
| | | | | 600/309 |
| 7,113,270 B2 * | 9/2006 | Buermann | ............ | G01B 11/26 |
| | | | | 178/18.09 |
| 7,151,460 B2 * | 12/2006 | Makela | ................ | G08B 17/107 |
| | | | | 340/628 |
| 7,486,386 B1 | 2/2009 | Holcombe et al. | | |
| 7,575,589 B2 * | 8/2009 | De Taboada | ......... | A61N 5/0613 |
| | | | | 607/88 |
| 7,875,173 B1 * | 1/2011 | Barnes | ................ | A61H 33/14 |
| | | | | 210/167.1 |
| 7,995,189 B2 * | 8/2011 | Yamaguchi | .......... | G01B 11/026 |
| | | | | 356/3.01 |
| 8,091,280 B2 * | 1/2012 | Hanzel | ................ | B60R 25/2054 |
| | | | | 296/146.4 |
| 8,679,102 B2 * | 3/2014 | Reichert | .............. | A61B 18/203 |
| | | | | 359/209.1 |
| 9,883,801 B2 * | 2/2018 | Stump | .................... | G16H 50/30 |
| 2006/0001859 A1 | 1/2006 | Lohmann | | |
| 2014/0259382 A1 | 9/2014 | Dobizl | | |
| 2015/0052678 A1 | 2/2015 | Bayley et al. | | |
| 2016/0024767 A1 * | 1/2016 | Hong | ..................... | G01S 17/88 |
| | | | | 4/668 |
| 2016/0083943 A1 * | 3/2016 | Shirai | ..................... | G01V 8/20 |
| | | | | 4/623 |
| 2016/0084959 A1 * | 3/2016 | Shirai | ..................... | E03C 1/057 |
| | | | | 4/623 |
| 2016/0170011 A1 * | 6/2016 | Halbritter | ............ | G01S 17/026 |
| | | | | 250/338.4 |
| 2017/0319014 A1 * | 11/2017 | Ophardt | ................ | A47K 5/1217 |

FOREIGN PATENT DOCUMENTS

| | | |
|---|---|---|
| EP | 926512 | 6/1999 |
| FR | 2761446 A1 | 10/1998 |
| GB | 2485568 A | 5/2012 |
| WO | 2013142224 | 9/2013 |

\* cited by examiner

INFRA-RED CONTROL DEVICE

BACKGROUND OF THE DISCLOSURE

The present disclosure relates to the field of control devices, and more particularly to the field of contactless control devices, in particular for a washroom fixture.

It is known to fit washroom facilities, such as wash basins, faucets, urinals, showers, hand dryers, soap dispensers, . . . with control devices that enable them to be operated without requiring the user to make contact, in particular hand contact. Such control devices present the advantage of keeping the washroom fixture clean since it is not touched by the user, thereby limiting the development and the transmission of germs or bacteria. Furthermore, they also make it possible to limit the quantity of water or of electricity that is consumed by the washroom fixture, since it runs only in the presence of a user, and stops when the user moves away and ceases to use it.

It is thus known to fit washroom facilities with contactless control devices, using infrared emitters and sensors. The washroom fixture is controlled as a function of the infrared intensity measured by the sensor. More precisely, the control device causes the washroom fixture to operate when the infrared intensity detected by the sensor increases, which corresponds to a user being present in the proximity of the detector.

An example of such a device is described in particular in application FR 2 761 446 A1. In that document, one of the infrared detectors is mounted at the end of the faucet and is directed towards the bowl into which the faucet delivers water: the infrared intensity measured by the sensor in the presence or absence of a user is thus known and easy to set. Nevertheless, the detector must be mounted facing a surface that is unchanging and known.

There also exist infrared detectors that serve to detect the presence of a user without needing to be mounted facing a determined surface. Such detectors are background-canceling sensors that make it possible, in particular by means of a system of lenses and/or an array of detectors, to be more accurate than standard infrared sensors in estimating the distance between a detector and the user. Such background-canceling sensors can thus be mounted somewhere other than at the free end of the faucet, e.g. at the base of the faucet.

Nevertheless, when a background-canceling detector is to be installed in a room having mirrors or ceramics, it is often necessary to perform an operation of setting up the sensor so that it can take account of interfering reflections in order to obtain the desired operation.

SUMMARY OF THE DISCLOSURE

The present disclosure seeks to solve the various technical problems mentioned above. In particular, embodiments of the present disclosure seek to provide a control device making it possible to better identify the control gestures of a user so as to avoid undesired untimely operation.

Thus, in a first aspect, there is provided a control device, in particular for a washroom fixture, the device comprising:
 an actuator;
 a sensor configured to detect the presence of a user in the proximity of the sensor; and
 a control circuit receiving, as input, signals from the sensor, and configured to control the actuator.
The sensor comprises:
 an emitter configured to emit an infrared signal; and
 a receiver configured to detect the infrared signal emitted by the emitter.

The control device also comprises means for measuring the return time of the infrared signal emitted by the emitter.

Thus, according to embodiments of the disclosure, the control device detects both the quantity of infrared reaching the receiver, and the time taken by the infrared signal to go from the emitter to the receiver. It is thus possible both to identify elements that reflect infrared and also to determine the distance between those elements and the sensor. Specifically, since the speed of infrared in air is known, the go-and-return time of the infrared signal makes it possible to determine the distance between the sensor and the element reflecting infrared, and thus to cause the washroom fixture to operate or not operate accordingly. In particular, whatever the background of the detection field of the sensor, the control device can distinguish between the background and control gestures made by a user by determining the go-and-return time of the reflected infrared.

The emitter may be a laser diode, for example a vertical-cavity surface-emitting laser diode. The use of a laser diode makes it possible to have an infrared emitter of known wavelength and of power that is easily modulated, while retaining small size.

The laser diode may emit at 850 nanometers (nm).

In a first embodiment, the means for measuring the return time of the infrared signal emitted by the emitter are mounted in the sensor. Under such circumstances, the signal sent by the sensor to the control circuit is representative of the go-and-return time of the infrared signal, in other words of the distance between the sensor and the reflecting element. It then suffices for the control circuit to compare that signal with a threshold value in order to decide whether or not to cause the washroom fixture to operate.

In an embodiment, the means for measuring the return time of the infrared signal emitted by the emitter are mounted in the control circuit. Under such circumstances, the sensor delivers data about the signal emitted by the emitter and about the signal received by the receiver, and the control circuit acts on the basis of that data to determine the go-and-return time, and thus whether or not to cause the washroom fixture to operate.

In another aspect, embodiments of the disclosure also provides a washroom fixture in particular with contactless operation, the fixture comprising:
 a body supplied by at least one water supply pipe and including a water outlet orifice; and
 a control device as described above;
 wherein the actuator of the control device is a solenoid valve, e.g. a bistable, monostable, or proportional solenoid valve, mounted in said at least one water supply pipe.

In this aspect, the control device controls the supply of water to the washroom fixture, and more particularly opens or closes it.

The emitter and the receiver may be mounted in the body of the washroom fixture. The presence of the sensor in the body of the washroom fixture enables the gestures for activating the washroom fixture to be determined better. Furthermore, this makes it possible to incorporate the sensor directly in the body of the washroom fixture, at a suitable position, thereby facilitating installation of the assembly in a room.

The emitter and the receiver may be mounted as a single element in the body of the washroom fixture.

The body of the washroom fixture may be for mounting above a bowl or a basin, and the body of the washroom fixture may comprise:

a free distal end for extending over the bowl or basin and including the water outlet orifice; and a proximal end arranged remote from the distal end for coming into contact with the bowl or basin.

The distance between the sensor and the proximal end may be less than the distance between the sensor and the distal end. Such a configuration corresponds to the situation in which the sensor is mounted at the base of the washroom fixture, and not at its free end, as in application FR 2 761 446 A1.

The washroom fixture may be selected from: a faucet; a shower; a toilet; a urinal; or a bidet.

In another aspect, embodiments of the disclosure also provides a dispenser for dispensing a substance, in particular soap, the dispenser comprising:

a reservoir containing said substance; and a control device as described above;

wherein the actuator of the control device comprises means for dispensing said substance from the reservoir, e.g. a pump.

In this aspect, the control device thus controls the quantity of a substance, such as soap, that is dispensed by the dispenser.

Further embodiments of the disclosure also provide a hair dryer or hand dryer comprising:

means for setting air into movement; and a control device as described above;

wherein the actuator of the control device is a drive motor for driving said means for setting air into movement, e.g. a direct current (DC) or alternating current (AC) electric motor.

In this aspect, the control device serves to switch the system on and off, in particular in order to limit the quantity of electricity it consumes.

BRIEF DESCRIPTION OF THE DRAWINGS

The disclosure and its advantages can be better understood on reading the following detailed description of three particular embodiments given as non-limiting examples and shown in the accompanying drawings, in which.

DETAILED DESCRIPTION OF THE DISCLOSURE

Figure 1:
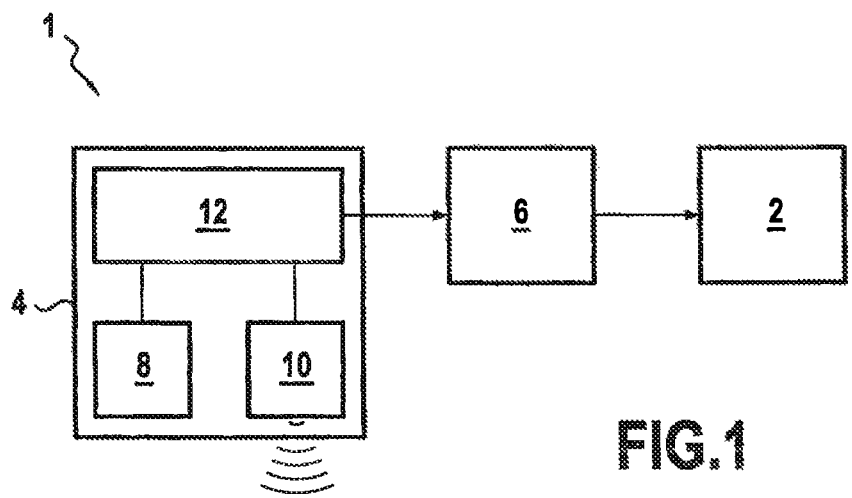
FIG. 1 is a block diagram of a control device of the disclosure.

FIG. 1 is a block diagram of a control device 1 of the disclosure.

The control device 1 serves to control an actuator 2, e.g. a solenoid valve, a pump, or indeed a drive motor.

The control device 1 thus has an infrared sensor 4, for the purpose of detecting the presence of a user in the proximity of the sensor, and a control circuit 6 that is configured to control the actuator 2 as a function of the signal received from the infrared sensor 4.

The infrared sensor 4 includes in particular an infrared receiver 8 and an infrared emitter 10 emitting an infrared signal. The infrared receiver 8 is configured to detect the infrared signal emitted by the emitter and reflected by a surface, e.g. the hand of a user.

The infrared emitter 10 may comprise a laser diode emitting in the infrared, for example, in the near infrared, e.g. at 850 nm. Furthermore, the laser diode of the infrared emitter 10 may be a vertical-cavity surface-emitting laser diode, better known under the term VCSEL diode.

The infrared receiver 8 is configured to detect photons, in particular infrared photons, and may comprise one or more cells that are sensitive to infrared.

The signal from the infrared receiver 8 is processed in order to determine whether or not the control circuit 6 is to cause the actuator 2 to operate. The processing of the signal may be performed by the infrared sensor 4, by the control circuit 2, or by both of them.

In the embodiment shown in FIG. 1, the processing of the signal from the infrared receiver 8 is performed by the infrared sensor 4 itself. In particular, the infrared sensor 4 has means 12 for measuring the return time of the infrared signal emitted by the emitter 10, and it sends a signal representative of that time to the control circuit 6. The control circuit 6 can then optionally cause the actuator 2 to operate as a function of the signal received by the sensor 4, e.g. by comparing it with a threshold value.

Figure 2:
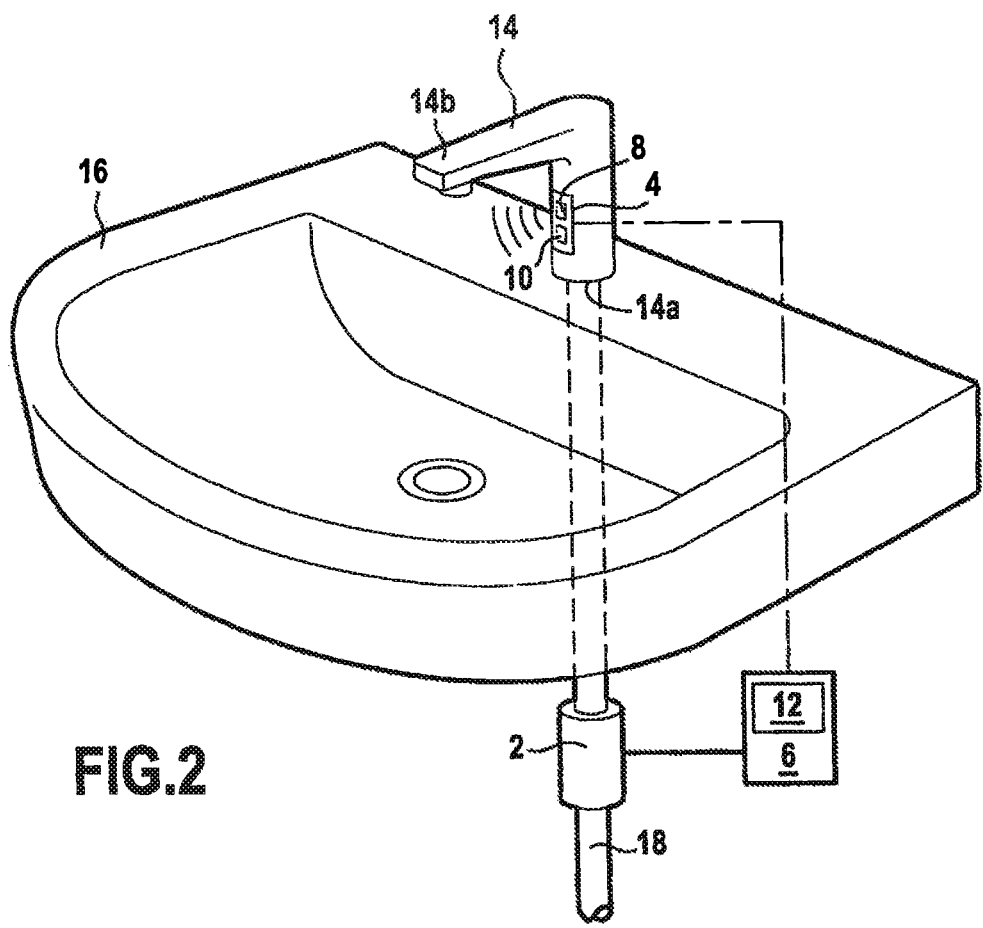
FIGS. 2 to 4 are diagrams of three applications of the control device of the disclosure.

FIG. 2 shows a first application of a control device of the disclosure. FIG. 2 shows a wash basin having a faucet 14 and a bowl 16. The faucet 14 has a proximal end 14a resting on the top surface of a rim of the bowl 16 and connected to a water supply pipe 18, and a distal end 14b extending above the bowl 16 and including a water outlet orifice. The faucet 14 also has an infrared sensor 4 in the proximity of its proximal end 14a, the sensor 4 having an emitter 10 and a receiver 8. In the application shown in FIG. 2, the actuator 2 is a solenoid valve mounted in the water supply pipe 18.

The sensor 4 is connected to a control circuit 6 that, in the embodiment described, comprises the means 12 for measuring the return time of the infrared signal, and that controls the actuator 2 formed by the solenoid valve.

In operation, the emitter 10 sends infrared signals, e.g. modulated signals. When a user moves a hand close to the faucet 14, that hand comes into the emission zone of the emitter 10 and reflects some of the infrared emitted by the emitter 10. The receiver 8 then detects the infrared reflected by the hand. The sensor 4 then sends signals to the means 12 for measuring the infrared signal return time so as to enable those means to determine the time taken by the infrared signal to return to the receiver 8.

When the return time of the infrared signal is less than a determined value, the control circuit 6 then causes the solenoid valve to open in order to cause water to run out from the faucet 14.

Since the emitter 10 continues to emit an infrared signal either continuously or at regular intervals, when the user's hand moves away from the sensor 4, because the user is no longer using the faucet, the control circuit 6 detects that the time taken by the infrared signal to return to the receiver 8 has increased and can cause the solenoid valve to close once more.

The disclosure thus makes it possible to determine accurately the distance between the sensor and a user's hand, without any constraint concerning the background or the environment of said sensor.

Figure 3:
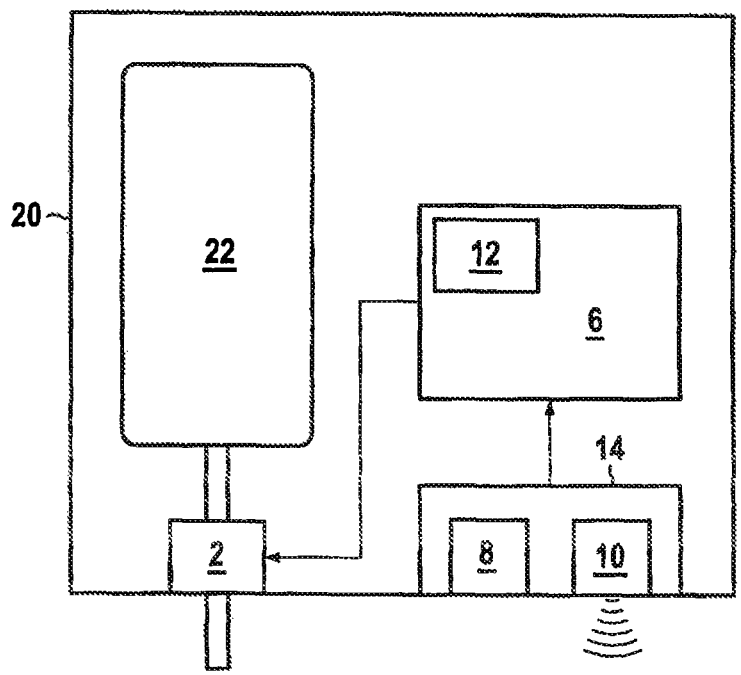

FIG. 3 shows a second application example of a control device of the disclosure. FIG. 3 shows a substance dispenser 20, in particular a soap dispenser, including a reservoir 22 of said substance. The substance dispenser 20 also has a sensor 4 with an infrared emitter 10 and an infrared receiver 8, together with a control circuit 6 causing the substance contained in the reservoir 22 to be dispensed or not to be dispensed. In the application shown in FIG. 3, the actuator 2 that is controlled by the control circuit 6 is a pump mounted at the outlet from the reservoir 22.

Thus, when a user moves a hand close to the substance dispenser, the sensor 4 and the control circuit 6 detect the approaching hand and the control circuit 6 can cause the actuator 2, specifically a pump, to operate e.g. so as to deliver a determined quantity of substance.

Figure 4:
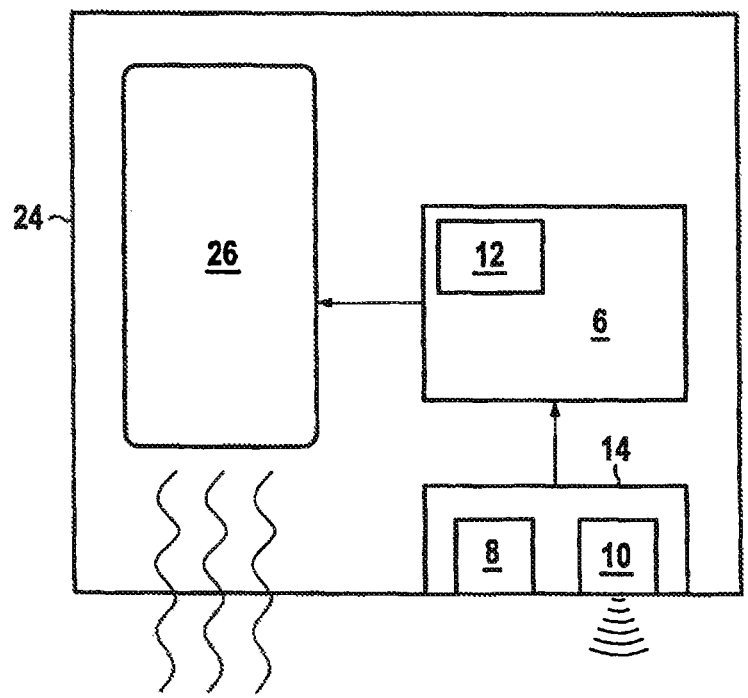

FIG. 4 shows a third application example of a control device of the disclosure. FIG. 4 shows a hand dryer or hair dryer 24. The hand dryer or hair dryer 24 comprises: means 26 for setting air into movement, a sensor 4 with an infrared emitter 10 and an infrared receiver 8, and a control circuit 6 for optionally causing the hand dryer or hair dryer 24 to operate. In the application shown in FIG. 4, the actuator controlled by the control circuit 6 is a drive motor (not shown) for driving the means 26 for setting air into movement.

When a user's hand or head comes close to the hand dryer or hair dryer 24, the sensor 4 and the control circuit 6 detect the approaching user and the control circuit 6 can cause the actuator, specifically the drive motor, to operate so as to establish the stream of drying air.

Thus, embodiments of the disclosure enables washroom facilities or other equipment present in washrooms, in particular public washrooms, to be controlled by the user without making contact and without imposing restrictive installation or aiming conditions in order to be able to operate correctly. In particular, determining the go-and-return time of the infrared signal serves to determine accurately the distance between the item reflecting the infrared signal and the infrared sensor, and thus to cause the actuators to operate accordingly.

The invention claimed is:

1. A washroom fixture, the fixture comprising:
   a body supplied by at least one water supply pipe and including a water outlet orifice; and
   a control device comprising: an actuator, a sensor configured to detect a presence of a user in a proximity of the sensor, and a control circuit receiving, as input, signals from the sensor and configured to control the actuator;
   wherein the sensor comprises an emitter configured to emit an infrared signal; and a receiver configured to detect the infrared signal emitted by the emitter;
   wherein the sensor also comprises a measuring device configured to measure a return time of the infrared signal emitted by the emitter; and
   wherein the actuator of the control device is a solenoid valve mounted in said at least one water supply pipe.

2. The washroom fixture according to the claim 1, wherein the solenoid valve is a bistable, monostable, or proportional solenoid valve.

3. The washroom fixture according to claim 1, wherein the emitter and the receiver are mounted in the body of the washroom fixture.

4. The washroom fixture according to claim 3, wherein the emitter and the receiver are mounted as a single element in the body of the washroom fixture.

5. The washroom fixture according to claim 1, wherein the body of the washroom fixture is configured to be mounted above a bowl or a basin, and wherein the body of the washroom fixture comprises:
   a free distal end configured to extend over the bowl or basin and including the water outlet orifice; and
   a proximal end arranged remote from the distal end and configured to come into contact with the bowl or basin.

6. The washroom fixture according to claim 5, wherein the distance between the sensor and the proximal end is less than the distance between the sensor and the distal end.

7. The washroom fixture according to claim 1, the washroom fixture being selected from: a faucet; a shower; a toilet; a urinal; or a bidet.

8. A dispenser configured to dispense a substance, the dispenser comprising:
   a reservoir containing said substance; and
   a control device comprising: an actuator, a sensor configured to detect a presence of a user in a proximity of the sensor, and a control circuit receiving, as input, signals from the sensor and configured to control the actuator;
   wherein the sensor comprises an emitter configured to emit an infrared signal; and a receiver configured to detect the infrared signal emitted by the emitter;
   wherein the sensor also comprises a measuring device configured to measure a return time of the infrared signal emitted by the emitter; and
   wherein the actuator of the control device comprises a dispensing device configured to dispense said substance from the reservoir.

9. The dispenser according to claim 8, wherein the dispensing device is a pump.

10. A hair dryer or hand dryer comprising:
    a device configured to set air into movement; and
    a control device comprising: an actuator, a sensor configured to detect a presence of a user in a proximity of the sensor, and a control circuit receiving, as input, signals from the sensor and configured to control the actuator;
    wherein the sensor comprises an emitter configured to emit an infrared signal; and a receiver configured to detect the infrared signal emitted by the emitter;
    wherein the sensor also comprises a measuring device configured to measure a return time of the infrared signal emitted by the emitter; and
    wherein the actuator of the control device is a drive motor configured to drive said device configured to set air into movement.

11. The hair dryer or hand dryer according to claim 10, wherein the drive motor is a DC or AC electric motor.

12. A faucet fixture comprising:
    a body supplied by at least one water supply pipe and including a water outlet orifice; and
    a control device comprising: an actuator, a sensor configured to detect a presence of a user in a proximity of the sensor, and a control circuit receiving, as input, signals from the sensor and configured to control the actuator;
    wherein the sensor comprises an emitter configured to emit an infrared signal; and a receiver configured to detect the infrared signal emitted by the emitter;
    wherein the sensor also comprises a measuring device configured to measure a return time of the infrared signal emitted by the emitter; and
    wherein the actuator of the control device is a solenoid valve mounted in said at least one water supply pipe.

* * * * *